(12) United States Patent
Dhuse et al.

(10) Patent No.: US 10,095,441 B2
(45) Date of Patent: Oct. 9, 2018

(54) END-TO-END SECURE DATA RETRIEVAL IN A DISPERSED STORAGE NETWORK

(71) Applicant: International Business Machines Corporation, Armonk, NY (US)

(72) Inventors: Greg R. Dhuse, Chicago, IL (US); Jason K. Resch, Chicago, IL (US); Trevor J. Vossberg, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 15/237,874

(22) Filed: Aug. 16, 2016

(65) Prior Publication Data
US 2017/0091031 A1    Mar. 30, 2017

Related U.S. Application Data

(60) Provisional application No. 62/222,819, filed on Sep. 24, 2015.

(51) Int. Cl.
*H03M 13/00* (2006.01)
*G06F 3/06* (2006.01)
(Continued)

(52) U.S. Cl.
CPC ............ *G06F 3/0653* (2013.01); *G06F 3/064* (2013.01); *G06F 3/067* (2013.01); *G06F 3/0611* (2013.01);
(Continued)

(58) Field of Classification Search
CPC ........ G06F 3/064; G06F 3/067; G06F 3/0661; G06F 3/0611; G06F 3/0653;
(Continued)

(56) References Cited

U.S. PATENT DOCUMENTS 4,092,732 A    5/1978  Ouchi
5,454,101 A    9/1995  Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Guy Lamarre
(74) *Attorney, Agent, or Firm* — Garlick & Markison; Timothy W. Markison; Kelly H. Hale

(57) ABSTRACT

A method includes a first computing device retrieving a decode threshold number of encrypted encoded data slices. The method further includes the first computing device generating a decoding matrix based on pillar numbers of the decode threshold number of encrypted encoded data slices and an encoding matrix. The method further includes the first computing device dispersed storage error decoding the decode threshold number of encrypted encoded data slices based on the decoding matrix to produce an encrypted data segment. The method further includes the first computing device sending the encrypted data segment and the pillar numbers to a second computing device. The method further includes the second computing device identifying a particular subset of encryption keys of the set of encryption keys based on the pillar numbers. The method further includes the second computing device decrypting the encrypted data segment based on the particular subset of encryption keys.

14 Claims, 9 Drawing Sheets

(51) Int. Cl.
  *H04L 29/06*       (2006.01)
  *G06F 8/65*        (2018.01)
  *H04L 29/08*       (2006.01)
  *G06F 11/10*       (2006.01)
  *H03M 13/15*       (2006.01)
  *H03M 13/37*       (2006.01)

(52) U.S. Cl.
  CPC .......... *G06F 3/0619* (2013.01); *G06F 3/0659* (2013.01); *G06F 3/0661* (2013.01); *G06F 8/65* (2013.01); *G06F 11/1092* (2013.01); *H03M 13/154* (2013.01); *H03M 13/3761* (2013.01); *H04L 63/061* (2013.01); *H04L 67/1097* (2013.01); *H04L 67/32* (2013.01); *H04L 67/34* (2013.01); *H03M 13/1515* (2013.01); *H04L 67/02* (2013.01); *H04L 67/06* (2013.01); *H04L 67/42* (2013.01)

(58) Field of Classification Search
  CPC ...... G06F 3/0659; G06F 8/65; G06F 11/1092; H04L 63/061; H04L 67/34; H04L 67/32; H04L 67/06; H04L 67/02; H04L 67/42; H04L 67/1097; H03M 13/154; H03M 13/1515; H03M 13/3761
  See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbell et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2012/0311395 A1* | 12/2012 | Leggette | G06F 21/6218 714/752 |
| 2017/0123907 A1* | 5/2017 | Dhuse | H04L 9/0861 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Hung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

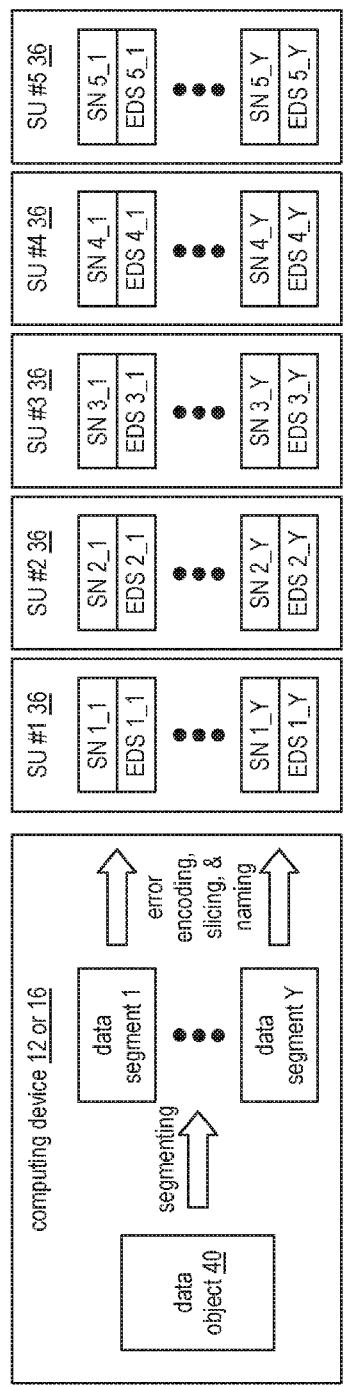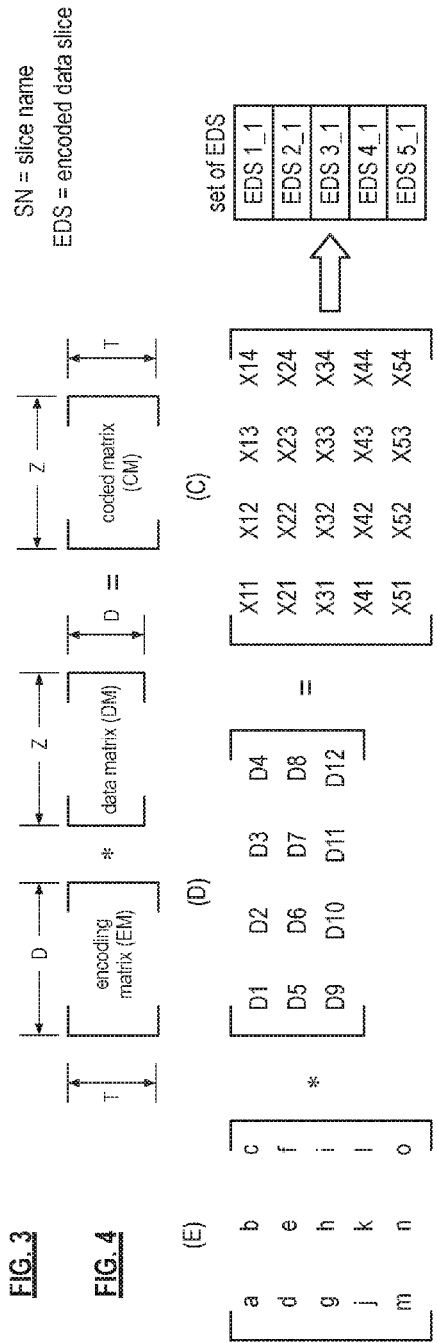

ary Patent Application claims priority
END-TO-END SECURE DATA RETRIEVAL IN A DISPERSED STORAGE NETWORK

CROSS-REFERENCE TO RELATED APPLICATIONS

The present U.S. Utility Patent Application claims priority pursuant to 35 U.S.C. § 119(e) to U.S. Provisional Application No. 62/222,819, entitled "IDENTIFYING AN ENCODED DATA SLICE FOR REBUILDING", filed Sep. 24, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Security of a cloud storage system is an important aspect for commercial viability. Security of any system, including cloud storage systems, is most vulnerable when data is in its raw form (e.g., no encryption, no password protection, etc.). When data is in its raw form, a person of ill-intent only needs to gain access to a computer storing, processing, and/or transmitting the data to have unauthorized access to the data. In many cloud storage systems, when data is being processed for dispersed storage, it is done so in a raw data format.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
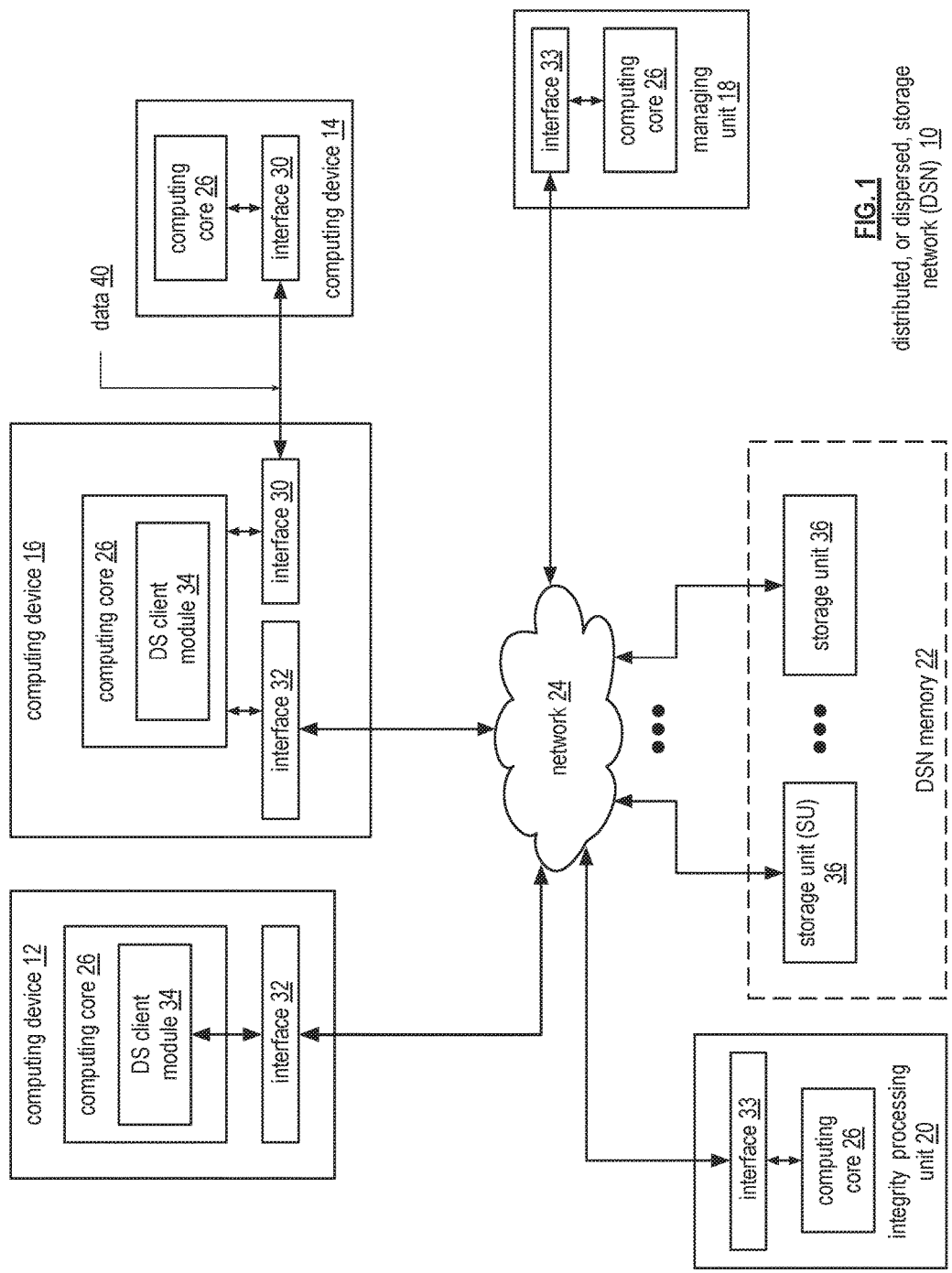
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
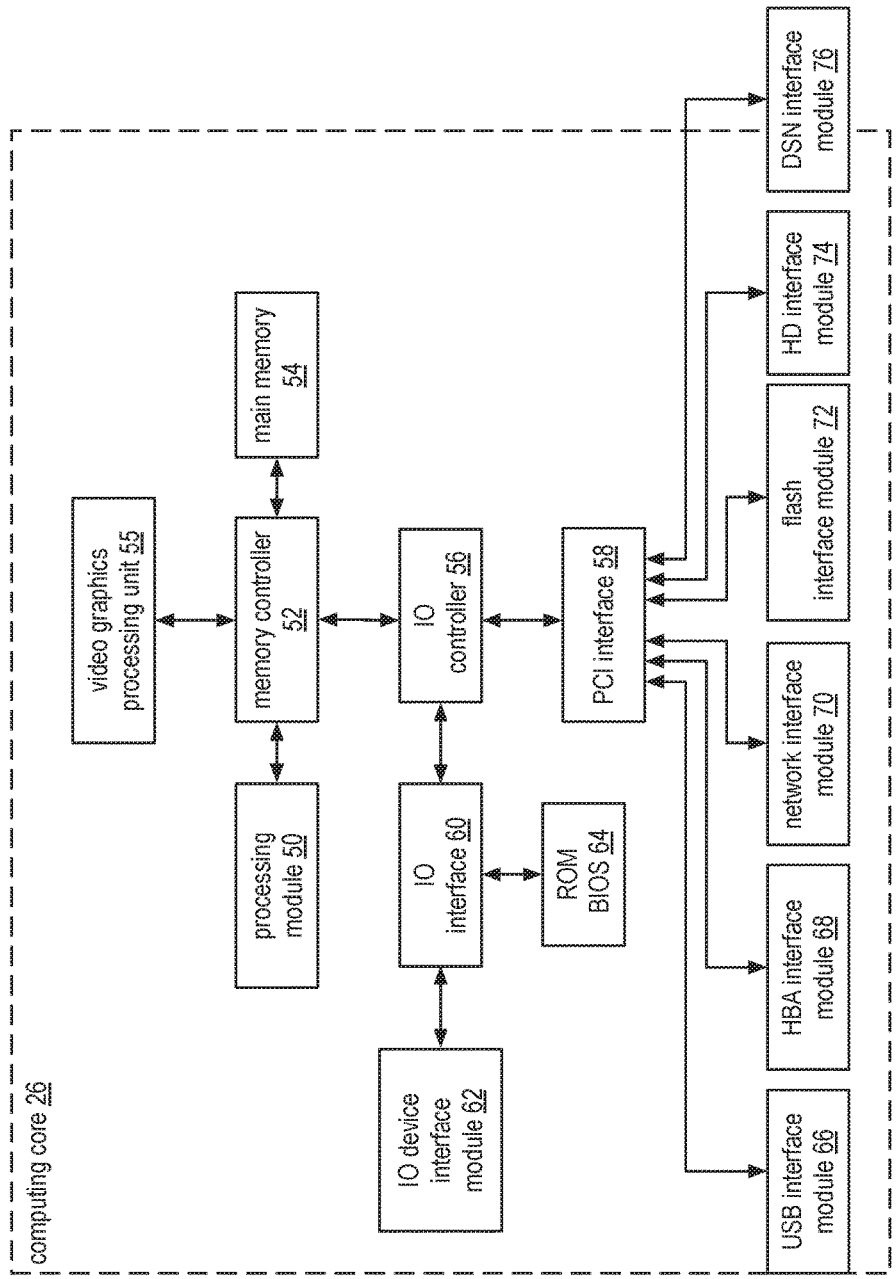
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
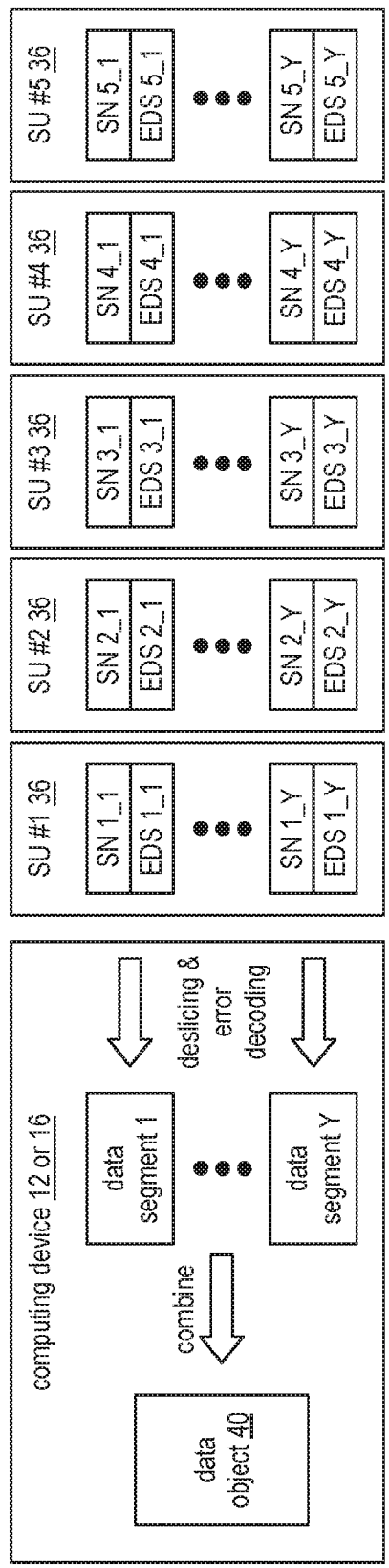
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
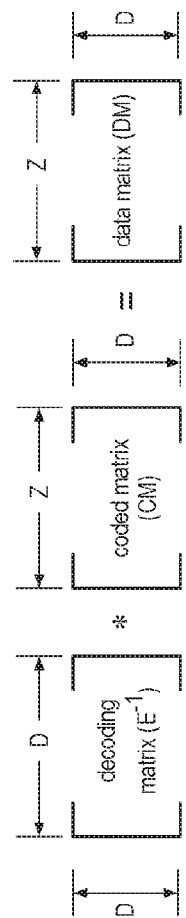
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
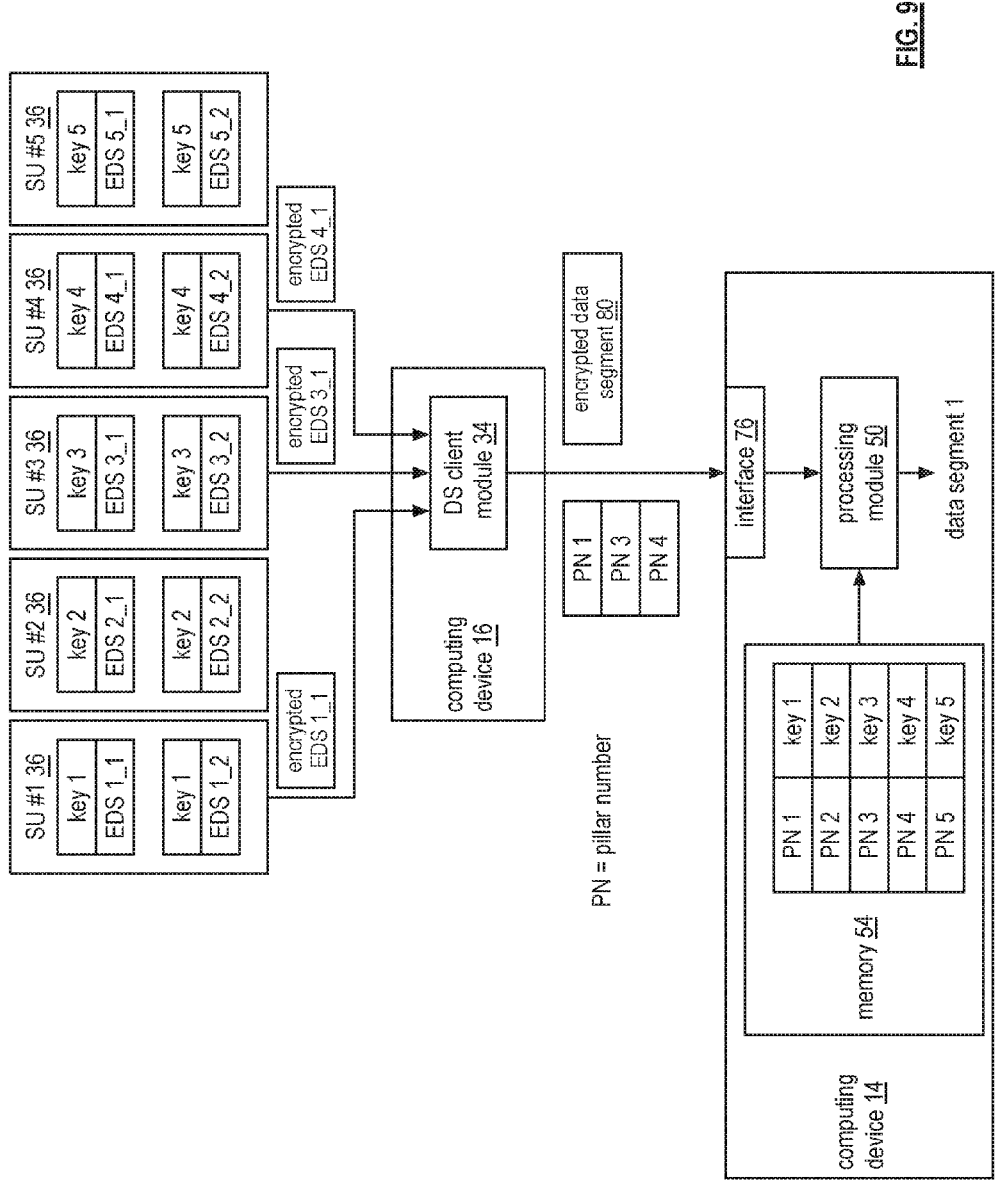
FIG. 9 is a schematic block diagram of an embodiment of a computing device securely retrieving a data segment from storage units via another computing device in accordance with the present invention.

FIG. 9 is a schematic block diagram of an embodiment of a computing device 14 securely retrieving a data segment (e.g., data segment 1) from storage units (e.g., SU #1 through SU #5) via another computing device 16. Computing device 16 includes the DS client module 34, which processes the encoding of data segments into sets of encoded data slices and the decoding of decode threshold number of sets of encoded data slices into data segments as discussed with reference to one or more of FIGS. 1-8. To facilitate end-to-end secure retrieval of data, the storage units SU #1 through SU #5 and the computing device 14 (which does not include a DS client module or is not currently using it for a data retrieval) share one or more sets of encryption keys that are not shared with computing device 16. As such, computing device 16 is encoding and decoding encrypted data segments without the ability to convert them into a raw data format.

In an example, the computing device 14 sends a data retrieval request to computing device 16 regarding a set of encoded data slices (e.g., EDS 1_1 through ED 5_1), which correspond to data segment (e.g., data segment 1). Computing device 16 sends a set of EDS retrieval requests to the set of storage units (SU #1 through SU #5). In this example, SU #1, SU #, and SU #4 respond to provide a decode threshold number of encoded data slices.

Prior to sending its respective encoded data slice (EDS) to computing device 16, each storage unit (e.g., SU #1, SU #, and SU #4) encrypts its EDS with a unique key to produce encrypted encoded data slices. For example, SU #1 encrypts EDS 1_1 with key 1, SU #3 encrypts EDS 3_1 with key 3, and SU #4 encrypts EDS 4_1 with key 4.

Figure 10:
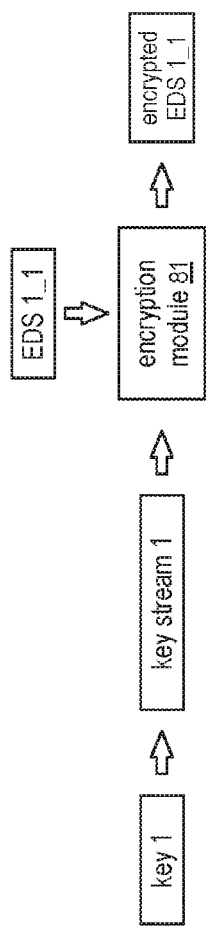
FIG. 10 is a diagram of an example of encrypting an encoded data slice in accordance with the present invention.

As a specific example and with reference to FIG. 10, a storage unit (e.g., SU #1) converts the encryption key (e.g., key 1) into a key stream. The encryption key may be any alpha-numeric value shared by the storage unit and computing device 14. As such, the encryption key may be a word, a specific number, a randomly generated number, etc. The storage unit converts the key into a key stream (e.g., key 1 into key stream 1). For example, if the encryption module 81 performs a finite field addition on the key stream (e.g., key stream 1) and the encoded data slice (e.g., EDS 1_1) to produce the encrypted data slice (e.g., encrypted EDS 1_1), the storage unit expands, contracts, and/or otherwise modifies the key to produce the key stream such that the key steam has a substantially similar number of bits as the encoded data slice. For example, the storage unit generates the key steam by padding the key, repeating the key, performing one or more mathematical functions on the key, performing one or more logic functions on the key, performing a compression function on the key, and/or performing an expansion function on the key.

The encryption module 81 (e.g., a finite field adder) encrypts the encoded data slice based on the key stream to produce the encrypted encoded data slice. In one embodiment, the finite field addition is done using an exclusive OR function. After encryption, each storage unit sends its encrypted encoded data slices to computing device 16.

Figure 11:
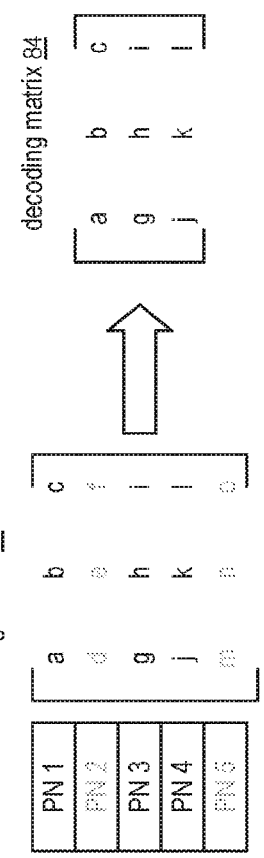
FIG. 11 is a diagram of an example of generating a decoding matrix from an encoding matrix in accordance with the present invention.
Figure 12:
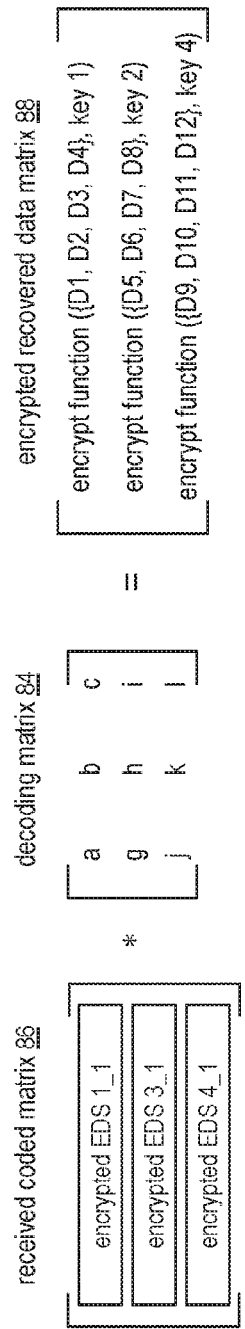
FIG. 12 is a diagram of an example of decoding a received encrypted and coded matrix in accordance with the present invention.

Returning to the discussion of FIG. 9, computing device 16, while not have access to the encryption keys, is aware that the encoded data slices are encrypted. With this knowledge, computing device 16 decodes the decode the decode threshold number of encrypted encoded data slices (e.g., encrypted EDSs 1_1, 3_1, and 4_1) to produce an encrypted data segment 80. For example, and as shown in FIGS. 11 and 12, computing device 16 converts the encoding matrix 82 into a decoding matrix 84 based on the pillar numbers (PN) of the encoded data slices it receives. In this example, computing device 16 receives encrypted EDSs 1_1, 3_1, and 4_1, which corresponds to pillar numbers 1, 3, and 4. Accordingly, rows 1, 3, and 4 of the encoding matrix 82 are used to create the decoding matrix 84.

Computing device 16 the decodes the decode threshold number of encrypted encoded data slices (e.g., encrypted EDSs 1_1, 3_1, and 4_1), which forms a received coded matrix 86, based on the decoding matrix 84 to produce an encrypted recovered data matrix 88. As shown for this example, the encrypted recovered data matrix 88 includes three rows of encrypted data blocks. For example, the first row includes data blocks D1-D4, which are encrypted based on an encryption function and an encryption key (as discussed with reference to FIG. 10).

Returning to the discussion of FIG. 9, computing device 16 sends a list of the pillar numbers (e.g., PN 1, PN 3, and PN 4 in this example) and the encrypted data segment 84, which corresponds to the encrypted recovered data matrix 88. Based on the pillar numbers, computing device 14 selects the appropriate keys to decrypt the encrypted data segment 84 to recover the data segment (e.g., data segment 1).

Figure 13:
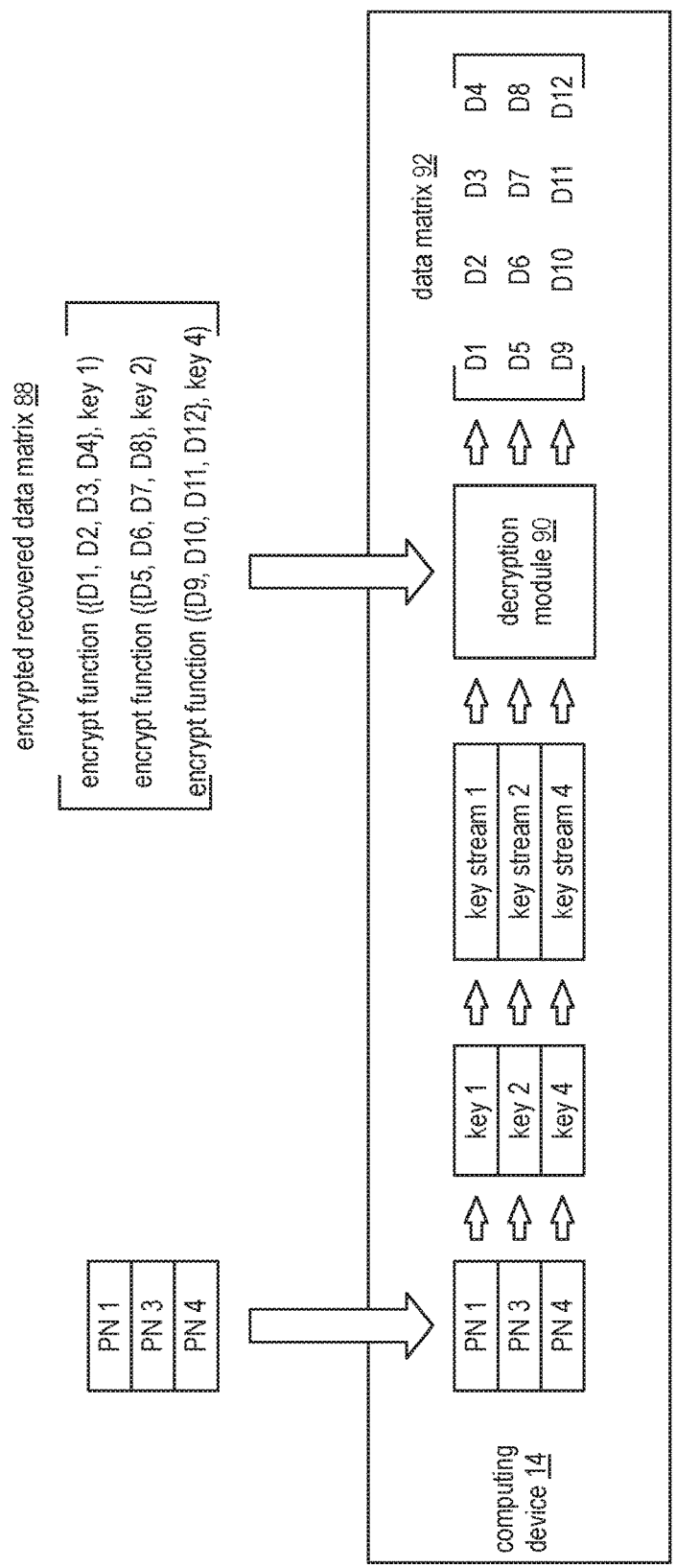
FIG. 13 is a diagram of an example of decrypting an encrypted recovered data matrix in accordance with the present invention.

FIG. 13 is a diagram of an example of decrypting an encrypted recovered data matrix 88 by computing device 14. As shown, computing device 14 receives the list of pillar numbers (PN) and the encrypted recovered data matrix 88 (i.e., the encrypted data segment). In an embodiment, computing device 14 generates a subset of key streams from the particular subset of encryption keys. For example, generates key stream 1 from key 1; key stream 3 from key 3; and key stream 4 from key 4 as discussed with reference to FIG. 10. Computing device 14 decrypts, via decryption module 14, the encrypted recovered data matrix 88 using the key steams.

As a specific example, the decryption module 90 performs a finite field addition (which, in one embodiment is an exclusive OR function) of key steam 1 with the first row of the encrypted recovered data matrix 88 (e.g., encrypted function ({D1, D2, D3, D4}, key) to recover an unencrypted row of the data matrix 92 (e.g., D1, D2, D3, and D4). A similar function is done to recover the other two rows of the data matrix (e.g., D5-D8 and D9-D12). The computing device converts the data matrix 92 into the data segment.

Figure 14:
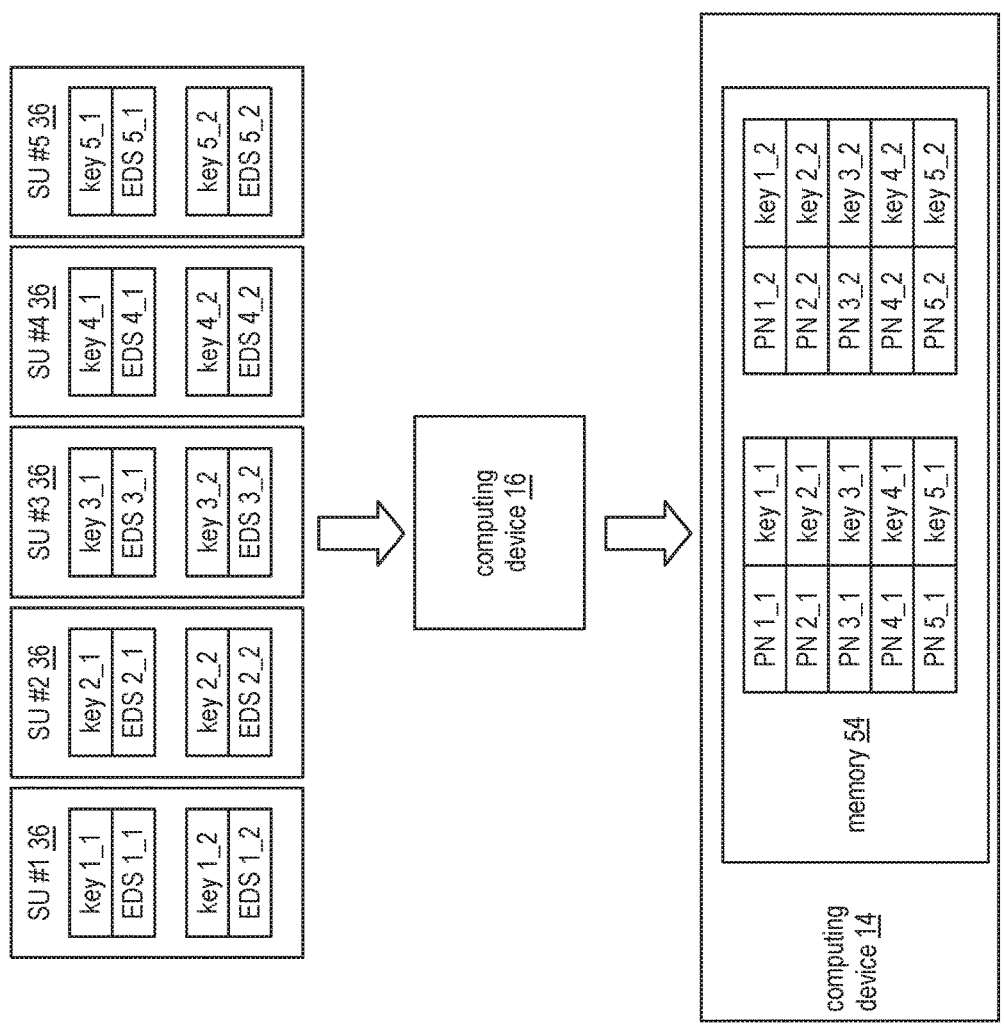
FIG. 14 is a schematic block diagram of an embodiment of a computing device securely retrieving a data segment from storage units via another computing device in accordance with the present invention.

FIG. 14 is a schematic block diagram of an embodiment of a computing device securely retrieving a data segment from storage units via another computing device. This embodiment is similar to the embodiment of FIG. 9, with the exception that more than one set of encryption keys may be used to encrypt encoded data slices. For example, each set of encoded data slices may have its own set of encryption keys. As another example, a set of encryption keys is used to encrypt sets of encoded data slices from a data object, for a group of data objects, and/or for data partitions of a data object, where a data partition includes two or more data segments. Note that the storage units and computing device 14 each store the set of encryption keys.

Figure 15:
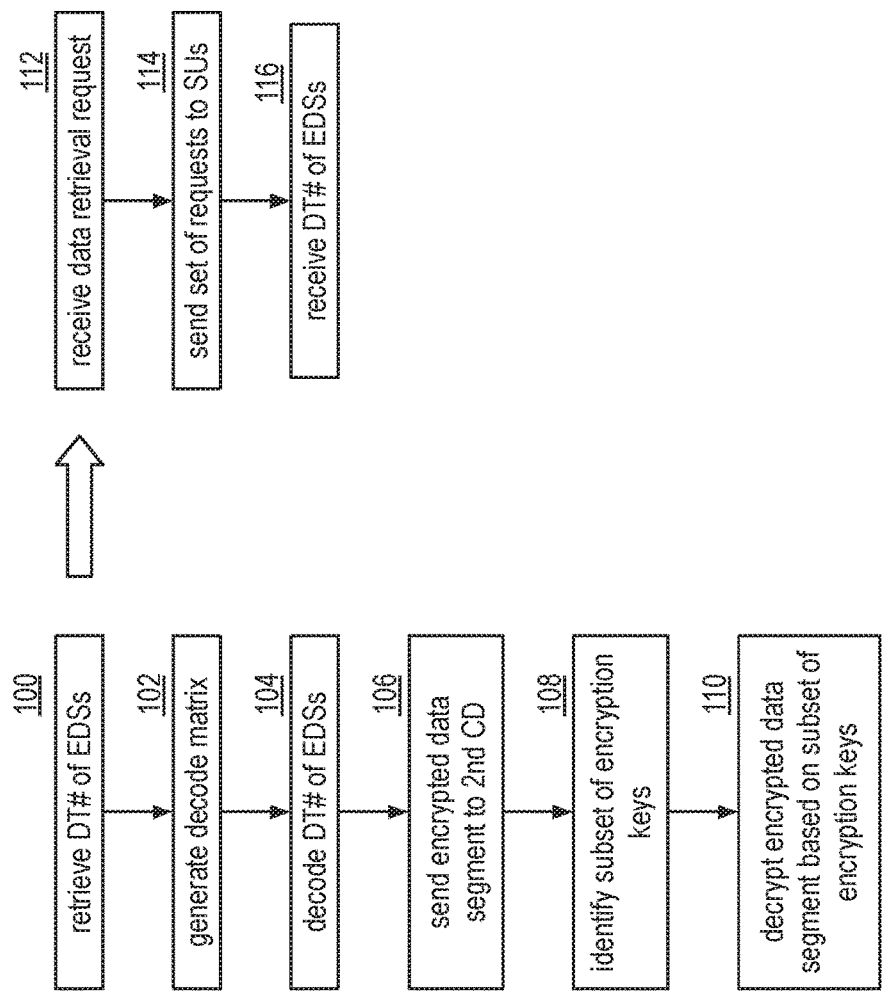
FIG. 15 is a logic diagram of an example of a method of end-to-end secure data retrieval in a DSN in accordance with the present invention.

FIG. 15 is a logic diagram of an example of a method of end-to-end secure data retrieval in a DSN. The method begins at step 100 where a first computing device (e.g., computing device 16) retrieves a decode threshold number of encrypted encoded data slices from at least some storage units of a set storage units. For example, the first computing device receives, at step 112 a data retrieval request for a set of encoded data slices from a second computing device (e.g., computing device 14). The first computing device sends, at step 114, a set of data retrieval requests to the set of storage units regarding the set of encoded data slices. The storage units that respond, encrypt their respective encoded data slices based on respective encryption keys as discussed above and send a decode threshold number of encrypted encoded data slices to the first computing device at step 116.

The method continues at step 102 where the first computing device generates a decoding matrix based on pillar numbers of the decode threshold number of encrypted encoded data slice and an encoding matrix. An example of this was discussed with reference to FIG. 11. The method continues at step 104 where the first computing device dispersed storage error decodes the decode threshold number of encrypted encoded data slices based on the decoding matrix to produce an encrypted data segment. An example of this was discussed with reference to FIG. 12. The method continues at step 106 where first computing device sends the encrypted data segment and the pillar numbers to a second computing device.

The method continues at step 108 where the second computing device identifies a particular subset of encryption keys of the set of encryption keys based on the pillar numbers. The method continues at step 110 where the second computing device decrypts the encrypted data segment based on the particular subset of encryption keys. An example of steps 108 and 110 was discussed with reference to FIG. 13.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for secure data retrieval in a dispersed storage network (DSN), the method comprises:
    retrieving, by an interface of a first computing device of the DSN, a decode threshold number of encrypted encoded data slices of a set of encrypted encoded data slices from at least some storage units of a set storage units of the DSN, wherein the set of storage units encrypt a set of encoded data slices using a set of encryption keys to produce the set of encrypted encoded data slices, and wherein a first encoded data slice of the set of encoded data slices is encrypted based on a first encryption key of the set of encryption keys to produce a first encrypted encoded data slice of the set of encrypted encoded data slices;
    generating, by the first computing device, a decoding matrix based on pillar numbers of the decode threshold number of encrypted encoded data slices and an encoding matrix;
    dispersed storage error decoding, by the first computing device, the decode threshold number of encrypted encoded data slices based on the decoding matrix to produce an encrypted data segment;
    sending, by the interface of the first computing device, the encrypted data segment and the pillar numbers to a second computing device of the DSN;
    identifying, by the second computing device, a particular subset of encryption keys of the set of encryption keys based on the pillar numbers; and
    decrypting, by the second computing device, the encrypted data segment based on the particular subset of encryption keys.

2. The method of claim 1, wherein the retrieving the decode threshold number of encrypted encoded data slices comprises:
    receiving, by the first computing device, a data retrieval request for the set of encoded data slices from the second computing device;
    sending, by the first computing device, a set of data retrieval requests to the set of storage units regarding the set of encoded data slices; and
    receiving, by the first computing device, the decode threshold number of encrypted encoded data slices from the at least some of the storage units.

3. The method of claim 1, wherein the generating the decoding matrix comprises:
    determining the pillar numbers of encoded data slices of the decode threshold number of encrypted encoded data slices; and
    reducing the encoding matrix to include rows corresponding to the pillar numbers to produce the decoding matrix.

4. The method of claim 1 further comprises:
    generating a first key stream from the first encryption key; and
    finite field adding the first key stream with the first encoded data slices to produce the first encrypted encoded data slice.

5. The method of claim 4, wherein the finite field adding comprises:
exclusive ORing the first key stream with the first encoded data slices to produce the first encrypted encoded data slice.

6. The method of claim 1, wherein the identifying the particular subset of encryption keys comprises:
generating the decoding matrix based on the pillar numbers; and
determining the particular subset of encryption keys based on rows of the decoding matrix.

7. The method of claim 1, wherein the decrypting the encrypted data segment based on the particular subset of encryption keys further comprises:
generating a subset of key streams from the particular subset of encryption keys;
converting the encrypted data segment into an encrypted data matrix in accordance with the decoding matrix; a finite field adding the subset of key streams with rows of the encrypted data matrix to produce a data matrix; and
converting the data matrix into the encrypted data segment.

8. A computer readable memory comprises:
a first memory element that stores operational instructions, which, when executed by a first computing device of a dispersed storage network (DSN), causes the first computing device to:
retrieve a decode threshold number of encrypted encoded data slices of a set of encrypted encoded data slices from at least some storage units of a set storage units of the DSN, wherein the set of storage units encrypt a set of encoded data slices using a set of encryption keys to produce the set of encrypted encoded data slices, and wherein a first encoded data slice of the set of encoded data slices is encrypted based on a first encryption key of the set of encryption keys to produce a first encrypted encoded data slice of the set of encrypted encoded data slices;
generate a decoding matrix based on pillar numbers of the decode threshold number of encrypted encoded data slices and an encoding matrix;
dispersed storage error decode the decode threshold number of encrypted encoded data slices based on the decoding matrix to produce an encrypted data segment;
send the encrypted data segment and the pillar numbers to a second computing device of the DSN; and
a second memory element that stores operational instructions, which, when executed by the second computing device, causes the second computing device to:
identify a particular subset of encryption keys of the set of encryption keys based on the pillar numbers; and
decrypt the encrypted data segment based on the particular subset of encryption keys.

9. The computer readable memory of claim 8, wherein the first memory element further stores operational instructions, which, when executed by the first computing device, causes the first computing device to retrieve the decode threshold number of encrypted encoded data slices by:

receiving a data retrieval request for the set of encoded data slices from the second computing device;
sending a set of data retrieval requests to the set of storage units regarding the set of encoded data slices; and
receiving the decode threshold number of encrypted encoded data slices from the at least some of the storage units.

10. The computer readable memory of claim 8, wherein the first memory element further stores operational instructions, which, when executed by the first computing device, causes the first computing device to generate the decoding matrix by:
determining the pillar numbers of encoded data slices of the decode threshold number of encrypted encoded data slices; and
reducing the encoding matrix to include rows corresponding to the pillar numbers to produce the decoding matrix.

11. The computer readable memory of claim 8 further comprises:
a third memory element that stores operational instructions, which, when executed by a first storage unit of the set of storage units, causes the first storage unit to:
generate a first key stream from the first encryption key; and
finite field add the first key stream with the first encoded data slices to produce the first encrypted encoded data slice.

12. The computer readable memory of claim 11, wherein the third memory element further stores operational instructions, which, when executed by a first storage unit of the set of storage units, causes the first storage unit to finite field adding by:
exclusive ORing the first key stream with the first encoded data slices to produce the first encrypted encoded data slice.

13. The computer readable memory of claim 8, wherein the second memory element further stores operational instructions, which, when executed by the second computing device, causes the second computing device to identifying the particular subset of encryption keys by:
generating the decoding matrix based on the pillar numbers; and
determining the particular subset of encryption keys based on rows of the decoding matrix.

14. The computer readable memory of claim 8, wherein the second memory element further stores operational instructions, which, when executed by the second computing device, causes the second computing device to decrypt the encrypted data segment based on the particular subset of encryption keys further by:
generating a subset of key streams from the particular subset of encryption keys;
converting the encrypted data segment into an encrypted data matrix in accordance with the decoding matrix; a finite field adding the subset of key streams with rows of the encrypted data matrix to produce a data matrix; and
converting the data matrix into the encrypted data segment.

* * * * *